United States Patent [19]

Heppell

[11] 3,900,047
[45] Aug. 19, 1975

[54] ELECTRICALLY HEATED PLASTIC PIPE
[75] Inventor: Douglas Fraser Heppell, Lake Cowichan, Canada
[73] Assignee: The Raymond Lee Organization, Inc., New York, N.Y. ; a part interest
[22] Filed: June 21, 1974
[21] Appl. No.: 481,644

[52] U.S. Cl. ................ 138/33; 174/74 R; 174/47; 219/307; 285/41; 285/423
[51] Int. Cl.² ................ E03B 7/10; F16L 53/00
[58] Field of Search ............ 285/41, 423; 174/74 R, 174/47; 219/205, 207, 522, 307; 138/33; 137/341

[56] References Cited
UNITED STATES PATENTS
2,716,179   8/1955   Cornella ................ 138/33 X FOREIGN PATENTS OR APPLICATIONS
1,326,967   4/1963   France ................ 174/74
128,400   10/1959   U.S.S.R. ................ 174/74

Primary Examiner—Dave W. Arola
Attorney, Agent, or Firm—Howard I. Podell

[57] ABSTRACT

A plastic pipe which may be electrically thawed to eliminate or prevent icing of the contents of the pipe. An internal electrical conductor in the form of a metal strip or film is mounted on an inside surface and runs the length of the pipe. A similar conductor is mounted on the outside surface of the pipe coupler units for joining the conductors of coupled pipe lengths, with the coupler units fitting inside the ends of joined pipe lengths.

3 Claims, 3 Drawing Figures

ELECTRICALLY HEATED PLASTIC PIPE

SUMMARY OF THE INVENTION:

My invention relates to a plastic pipe which may be electrically heated to prevent or eliminate icing within the pipe, and particularly to a plastic pipe formed with a conductor mounted on the internal pipe wall which run the length of the pipe. The conductors of coupled pipe lengths are joined by a conductor on the external surface of the pipe coupler units.

BRIEF DESCRIPTION OF THE DRAWING:

The objects and features of the invention may be understood with reference to the following detailed description of an illustrative embodiment of the invention, taken together with the accompanying drawings in which.

Figure 1:
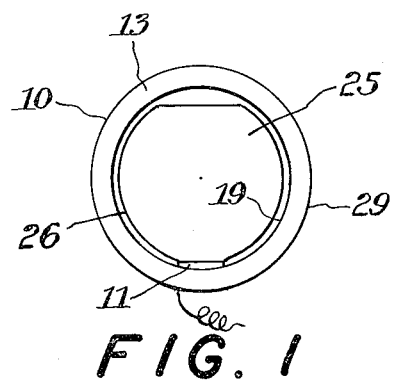
FIG. 1 illustrates an end view of the invention.
Figure 2:
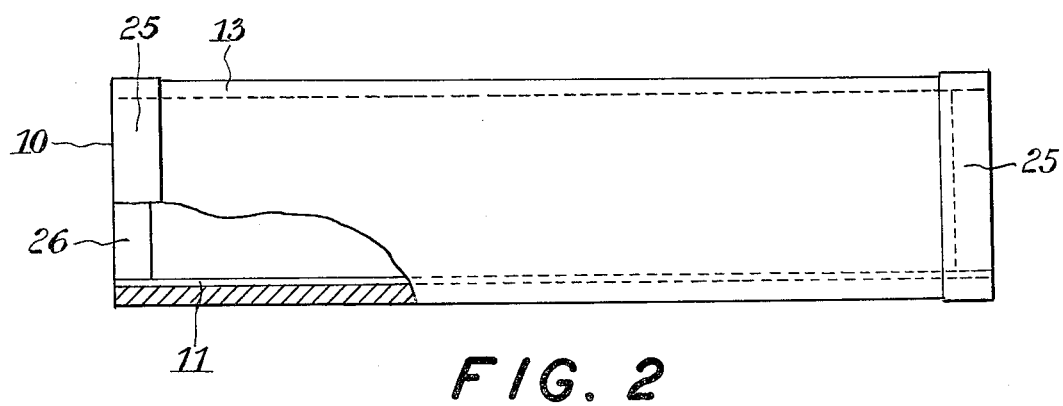
FIG. 2 illustrates a side view of the invention.
Figure 3:
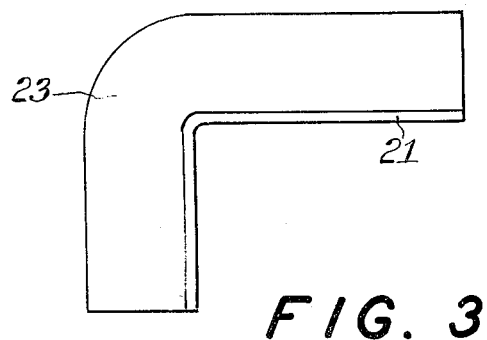
FIG. 3 illustrates a side view of the invention in the form of an elbow coupling.

DESCRIPTION OF THE PREFERRED EMBODIMENT:

Turning now descriptively to the drawings, in which similar reference characters denote similar elements throughout the several views, FIGS. 1–3 illustrate the thawable pipe 10 which is formed of a plastic tube 13 fitted with a metal conductor 11 mounted on an internal wall 19 of the tube 13. Conductor 11 runs the length of the tube 13. Separate lengths of pipe 10 are physically coupled together by means of couplers such as elbow 23, which snugly fits inside of an end 25 of tube 13, with elbow 23 formed with an external conductor 21 that runs its length and joins the conductors 11 of two coupled lengths of tubes 13.

A ring 26 of conductor metal may be located on the internal face of each pipe end 25 to electrically join internal conductor 11 of a pipe to external conductor 21 of a coupler.

External conductor 21 on coupling unit 23 permits the application of external power source electrodes between specific couplers 23 joined to lengths of tubing, when it is desired to thaw the section of tubing between such supply electrodes, so that an electric heating current will flow in the conductors 11 and 21 and create sufficient heat to thaw a frozen section of piping 10.

Alternately each end of an installed piping system of joined pipes 10 may be connected to a source of electric current so that an electric current is set up in both conductors 11 and 21 to generate sufficient heat during freezing conditions to prevent ice from forming inside of the piping.

Since the electric heating current conventionally applied is of a low voltage, the conductors 11 and 21 need not be insulated, and serve the conventional purpose of an electrical ground when not employed for thawing purposes.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A plastic pipe which is fitted with an electrical conductor on an internal wall of the pipe that runs the length of the pipe, said conductor furnishing a path for a flow of electrical current to heat the contents of the pipe, said conductor being electrically connected to electrical contact means adjacent to and inside each end of the pipe.

2. The combination as recited in claim 1, together with a coupler unit of a size to fit inside an end of a length of the plastic pipe to join together two such lengths of the plastic pipe, said coupler fitted with an electrical conductor formed along the length of the coupler on the coupler external wall such that the external conductor of the coupler contacts the electrical contact means of each said plastic pipe to which it is coupled.

3. The combination as recited in claim 1 in which the electrical contact means adjacent to an end of the plastic pipe is a ring of electrical conducting material on the internal wall of the plastic pipe, said ring being wholly contained within the pipe.

* * * * *